United States Patent
Accolla

(10) Patent No.: US 10,813,818 B1
(45) Date of Patent: Oct. 27, 2020

(54) RUBBER COATING

(71) Applicant: Raymond William Accolla, Suffern, NY (US)

(72) Inventor: Raymond William Accolla, Suffern, NY (US)

( * ) Notice: Subject to any disclaimer, the term of this patent is extended or adjusted under 35 U.S.C. 154(b) by 0 days.

(21) Appl. No.: 16/433,038

(22) Filed: Jun. 6, 2019

Related U.S. Application Data

(63) Continuation-in-part of application No. 15/915,790, filed on Mar. 8, 2018, now Pat. No. 10,357,417.

(51) Int. Cl.
| | |
|---|---|
| *A61G 17/04* | (2006.01) |
| *E04D 7/00* | (2006.01) |
| *E01C 9/00* | (2006.01) |

(52) U.S. Cl.
CPC .............. *A61G 17/042* (2016.11); *E01C 9/00* (2013.01); *E04D 7/00* (2013.01)

(58) Field of Classification Search
CPC ................ A61G 17/042; A61G 17/007; A61G 17/0076; E01C 9/00; E04D 7/00; E04H 13/00; C09D 121/00; C09D 117/00; C08C 19/08
USPC ...... 27/19, 35, 3, 6; 52/128, 140; 427/421.1; 428/440, 465, 492
See application file for complete search history.

(56) References Cited

U.S. PATENT DOCUMENTS

| | | | | |
|---|---|---|---|---|
| 1,617,588 | A * | 2/1927 | Geer | B32B 15/06 428/466 |
| 1,853,747 | A * | 4/1932 | Rosenqvist | C25D 1/00 204/275.1 |
| 2,265,263 | A * | 12/1941 | Brookins | A61G 17/036 27/3 |
| 3,130,520 | A * | 4/1964 | Newman, Jr. | E04H 13/00 52/135 |
| 3,787,545 | A * | 1/1974 | Chandler et al. | E04H 13/00 264/135 |
| 4,128,981 | A * | 12/1978 | Juba | E04H 13/00 156/333 |
| 4,448,826 | A * | 5/1984 | Davidian | A61G 17/042 428/35.8 |
| 4,520,043 | A * | 5/1985 | Davidian | A61G 17/04 427/239 |

(Continued)

*Primary Examiner* — William L Miller
(74) *Attorney, Agent, or Firm* — Michael J. Feigin, Esq.; Feigin and Fridman LLC

(57) ABSTRACT

Methods utilizing a rubber coating developed from chemical devulcanization are disclosed herein. One method includes chemically devulcanizing rubber to create liquid rubber, placing the liquid rubber into a mold configured to form a liner for use with a casket, and drying the liquid rubber to form the liner, which lines an interior of the casket. Another method includes chemically devulcanizing rubber into liquid rubber, placing the liquid rubber into a pressurized spray container, forming a liquid rubber coating spray by preserving the liquid rubber within the spray container, spraying the liquid rubber onto a surface, and drying the liquid rubber to solidify it over the surface. An alternative method includes chemically devulcanizing rubber into liquid rubber, mixing the liquid rubber with asphalt to form a liquid rubber-asphalt mixture, paving a surface with the liquid rubber-asphalt mixture, and drying the liquid rubber-asphalt mixture to solidify it over the surface.

10 Claims, 12 Drawing Sheets

(56) References Cited

U.S. PATENT DOCUMENTS

| | | | | |
|---|---|---|---|---|
| 4,827,581 A | * | 5/1989 | Davidian | A61G 17/04 27/3 |
| 5,115,607 A | * | 5/1992 | Pirozzoli | E04H 13/006 52/134 |
| 5,140,728 A | * | 8/1992 | Chandler | A61G 17/04 27/35 |
| 5,157,817 A | * | 10/1992 | Davidian | B28B 19/0046 27/35 |
| 5,666,705 A | * | 9/1997 | Semon | A61G 17/00 27/19 |
| 6,253,503 B1 | * | 7/2001 | Flood | A61G 17/048 52/134 |
| 7,197,794 B2 | * | 4/2007 | Davis | A61G 17/047 27/19 |
| 7,767,722 B2 | * | 8/2010 | Fan | C08J 11/28 521/41 |
| 8,578,574 B1 | * | 11/2013 | Smith | E04H 13/00 27/35 |
| 2003/0182779 A1 | * | 10/2003 | Sevey | A61G 17/04 27/19 |

* cited by examiner

RUBBER COATING

CROSS-REFERENCE TO RELATED APPLICATIONS

This is a continuation-in-part application of U.S. application Ser. No. 15/915,790 filed on Mar. 8, 2018, which application is incorporated by reference herein in its entirety for all purposes.

FIELD OF THE DISCLOSED TECHNOLOGY

The disclosed technology relates to rubber coatings, more specifically to a textured and nonporous rubber coating for lining and sealing surfaces in order to make them waterproof and slip proof.

BACKGROUND OF THE DISCLOSED TECHNOLOGY

In the funeral industry devices and methods for preventing fluids from leaving a casket leave room for improvement. Indeed, decomposed body fluids from human remains are still finding their way out of caskets, burial vaults, and mausoleums and into the environment, causing contamination. The decomposed body fluids seep through the porous materials of all these items, finding their way out. Therefore, there is a need for a nonporous liner and method for lining a casket and a burial vault with the same, such that decomposed body fluids within these caskets and burial vaults are prevented from escaping therefrom and contaminating the environment. The present disclosed technology provides a nonporous and waterproof rubber coating and method of use the same for sealing a casket and burial vault.

Concrete surfaces, wood surfaces, and asphalt are all outdoor surfaces that damage over time. For instance, these surfaces all crack, break, split and separate due to the elements, such as water, metals, and the like. Therefore, there is a need in the art for a textured rubber coating that is configured to coat or mix with these surfaces so as to seal them and make them waterproof and slip proof. The textured rubber coating preserves the structural integrity of the surfaces and enable users to walk on them without slipping and falling.

SUMMARY OF THE DISCLOSED TECHNOLOGY

Disclosed herein is a method of lining a casket comprising the steps of chemically devulcanizing rubber sourced from vehicle tires to create liquid rubber, placing (such as by injecting, using an injection molding process) the liquid rubber into a mold for subsequent use with a casket, and leaving the liquid rubber to dry into a liner shaped by the mold. When dried the liner is configured to be inserted into a casket and coat at least a part of the interior of the casket. This method prevents fluids from leaking out of the casket and water from entering and mixing with decomposed body fluids within the casket. In one embodiment, the casket is placed in a mausoleum within a casket tray formed from the liquid rubber. In another embodiment, an additional liner formed by the same process of chemically devulcanizing rubber is placed on an outside of the casket.

In some embodiments, a portion of the liquid rubber is placed into a spray can. In one embodiment, an outside portion of a burial vault is sprayed with the liquid rubber. In another embodiment, an interior portion of a burial vault is sprayed with the liquid rubber. In another embodiment, the liner is formed by spraying a part of an interior of the casket with the liquid rubber from the spray can or commercial spraying apparatus. A "commercial spraying apparatus" is defined as a device which pumps liquefied rubber from a drum of at least 29 gallons, such as a 30 or 50 gallon drum known in the art.

In some embodiments, the liner includes a rectangular body including a base and a planar upper surface. The planar upper surface includes longitudinally extending sidewalls and laterally extending sidewalls that taper upwardly from the planar upper surface to a perimeter edge of the rectangular body.

Also disclosed herein is a method of treating a surface comprising the steps of chemically devulcanizing rubber sourced from vehicle tires into liquid rubber, placing the liquid rubber into a pressurized spray container prior to cooling, forming a liquid rubber coating spray by preserving the liquid rubber within the spray container such that it does not solidify therein prior to use, spraying the liquid rubber onto a surface, and drying the liquid rubber to solidify it over the surface. In one embodiment, the surface is a concrete surface. In another embodiment, the concrete surface is a foundation wall. In other embodiments, the surface is a wooden surface. In alternative embodiments, the surface is a step.

Further, disclosed herein is a method of treating asphalt and using the same to pave a surface comprising the steps of chemically devulcanizing rubber sourced from vehicle tires into liquid rubber, mixing the liquid rubber with asphalt prior to cooling to form a liquid rubber-asphalt mixture, paving a surface with the liquid rubber-asphalt mixture, and drying the liquid rubber-asphalt mixture to solidify it over the surface.

For purposes of this disclosure, the following definitions are used. "Coating" used interchangeably with "sealant", refers to a material used for filling or sealing something so as to make it airtight and/or watertight. "Nonporous" refers to a material or object that is impervious or not permeable by water, air, or the like. "Taper" refers to diminish or reduce in thickness, or diameter, toward one end. "Longitudinal" refers to running lengthwise rather than across. "Lateral" refers running of, running across or widthwise rather than lengthwise.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Methods utilizing a rubber coating developed from chemical devulcanization are disclosed herein. One method includes chemically devulcanizing rubber to create liquid rubber, placing (which can include "injecting") the liquid rubber into a mold configured to form a liner for use with a casket, and drying the liquid rubber to form the liner, which lines an interior of the casket. Another method includes chemically devulcanizing rubber into liquid rubber, placing the liquid rubber into a pressurized spray container, forming a liquid rubber coating spray by preserving the liquid rubber within the spray container, spraying the liquid rubber onto a surface, and drying the liquid rubber to solidify it over the surface. An alternative method includes chemically devulcanizing rubber into liquid rubber, mixing the liquid rubber with asphalt to form a liquid rubber-asphalt mixture, paving a surface with the liquid rubber-asphalt mixture, and drying the liquid rubber-asphalt mixture to solidify it over the surface.

Embodiments of the present disclosed technology will become clearer in view of the following description of the figures.

Figure 1:
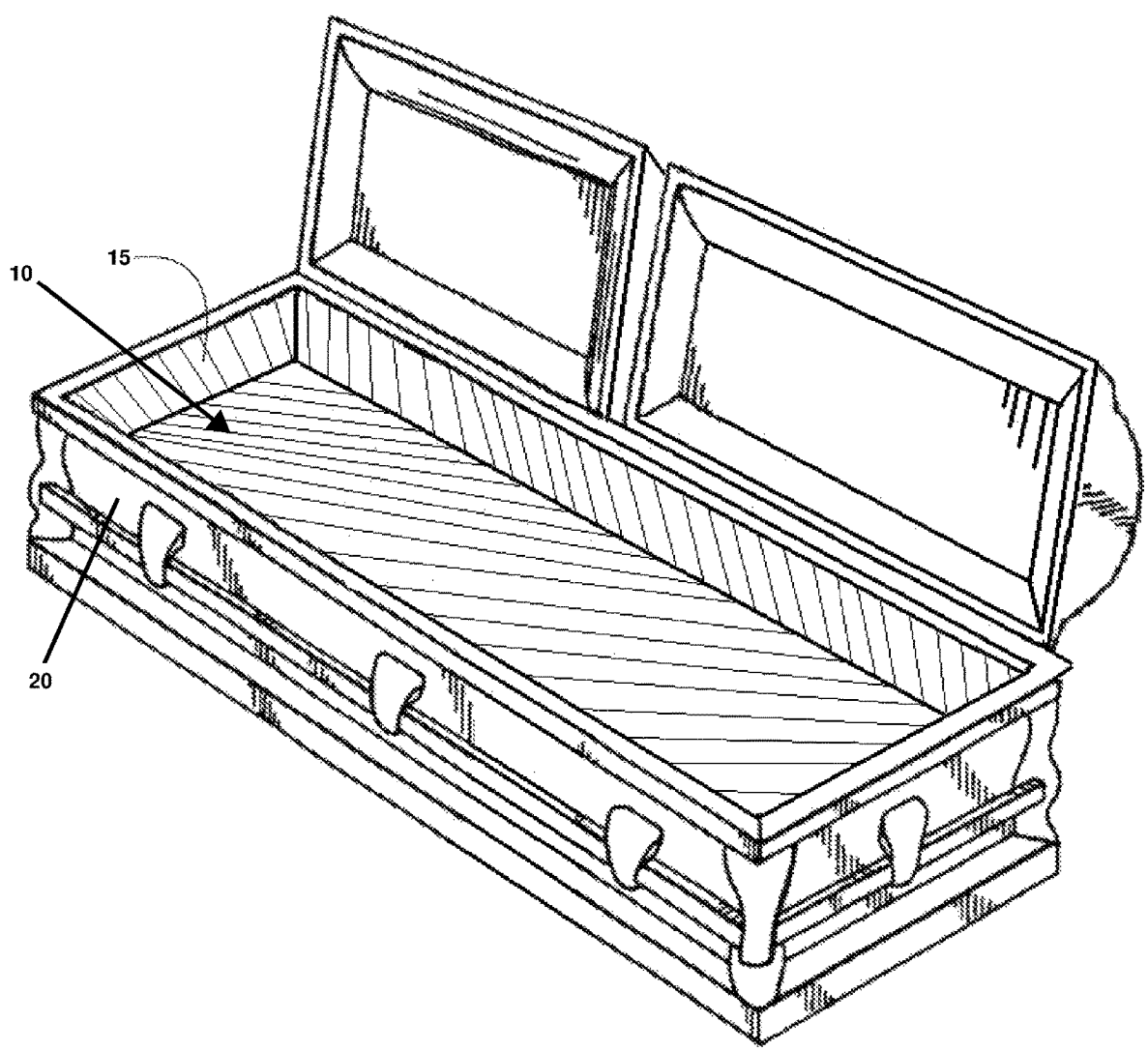
FIG. 1 shows a perspective view of the rubber coating in use according to one embodiment of the present disclosed technology.

FIG. 1 shows a perspective view of the rubber coating in use according to one embodiment of the disclosed technology. The present disclosed technology comprises a rubber coating 10 produced by the process of chemical devulcanization. Chemical devulcanization enables users to revert solid rubber into liquid rubber, thereby allowing it to be reformulated into a new product.

In one embodiment, the rubber coating 10 is manufactured by chemically devulcanizing rubber sourced from tires, such as vehicle or automobile tires, and the like. Indeed, all of the herein embodiments of the rubber coating 10 can be manufactured by the chemical devulcanization of rubber sourced from tires. Once the solid rubber turns into the liquid rubber after the chemical devulcanization process, the liquid rubber can be injected into a specific mold in order to shape the liquid rubber into a desired product. The liquid rubber is then cooled or left to dry, and the solid rubber coating 10 end-product is UV resistant, flexible, non-porous, and textured so as to make it slip proof, waterproof and airtight. The rubber coating 10 is configured to prevent separation and cracking and serve as a filler and sealant. The rubber coating may be manufactured in five different textures including, smooth, medium, coarse, rough, and grainy.

In one embodiment, the rubber coating 10 is formed into a casket liner 15 by chemically devulcanizing solid rubber, injecting the liquid devulcanized rubber into a casket liner mold, and letting the liquid rubber cool dry until it becomes solid. After the liquid rubber is dry, the casket liner 15 is used to line a casket 20. In this way, the waterproof and watertight nature of the casket liner 15 prevents decomposed body fluids from leaking out of the casket 20 and prevents water from entering the casket 20 and mixing with the decomposed body fluids by holding them therein.

The casket liner 15 is configured to coat at least a part of an interior of the casket 20. In one embodiment, the casket liner 15 lines the interior of the casket 20 along its entire perimeter, as shown in FIG. 1. In another embodiment, the casket liner 15 lines at least an interior side of the casket 20. In an alternative embodiment, the casket liner lines the entire interior side of the casket 20. In yet another embodiment, the casket liner 15 is removably insertable into the casket 20 and sized to fit within the perimeter of the inside of the casket 20. In an alternative embodiment, the casket liner 15 is configured to receive the remains of the deceased thereon.

In an alternative embodiment, a second or additional casket liner is formed by chemically devulcanizing solid rubber, injecting the liquid devulcanized rubber into a casket liner mold, and letting the liquid rubber dry until it becomes solid. The additional casket liner is placed on the outside of the casket 20 in order to further aid in the prevention of water from entering the casket. In one embodiment, the additional casket liner is configured to receive a casket thereon.

Figure 2:
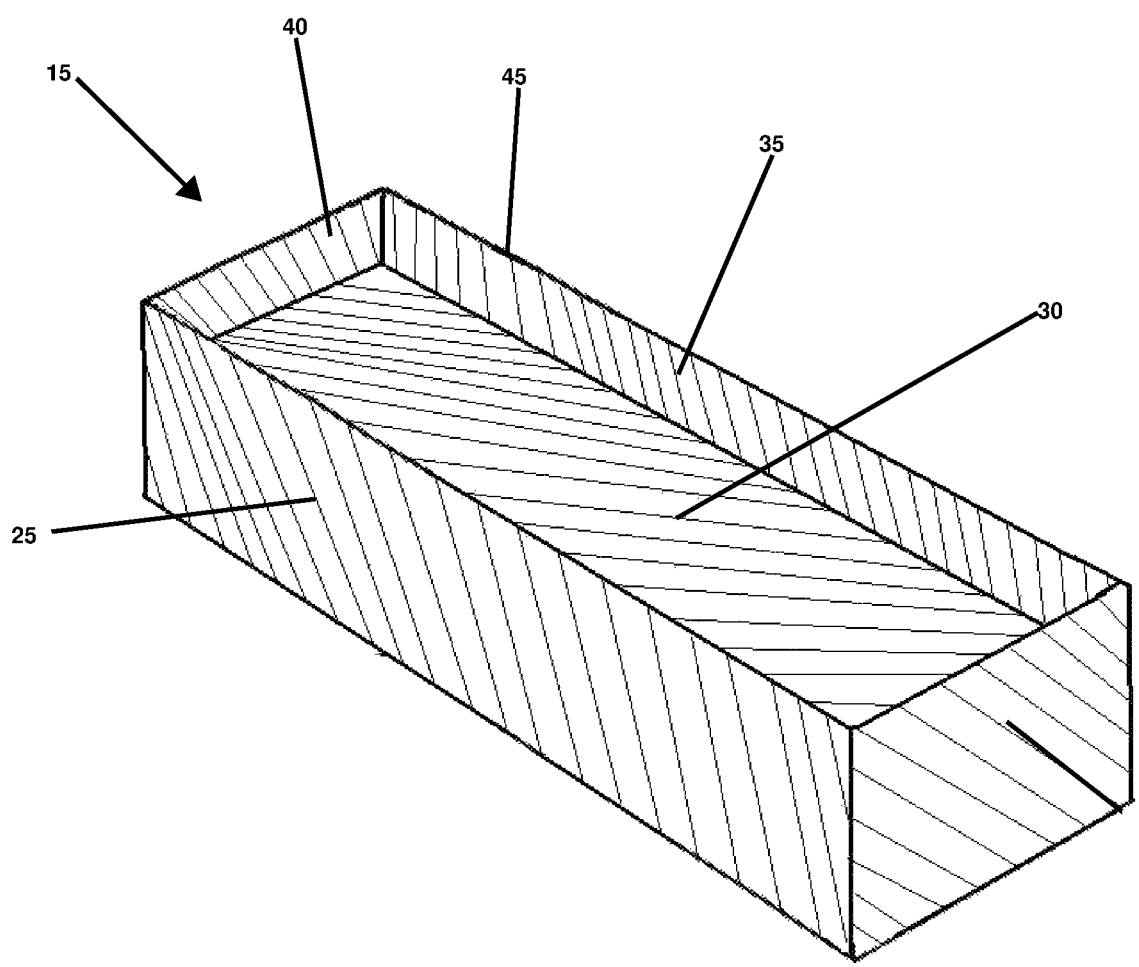
FIG. 2 shows a perspective view of the rubber coating according to one embodiment of the present disclosed technology.

FIG. 2 shows a perspective view of the rubber coating according to one embodiment of the present disclosed technology. In one embodiment, the casket liner 15 includes a rectangular body 25 including a base and an upper surface 30. The upper surface 30 includes longitudinally extending sidewalls 35 and laterally extending sidewalls 40 that taper upwardly from the upper surface 30 to a perimeter edge 45 of the rectangular body 25. In this way, the sidewalls 35, 40 help receive and maintain the remains of the deceased. In one embodiment, the upper surface 30 is a flat or planar surface.

Figure 3:
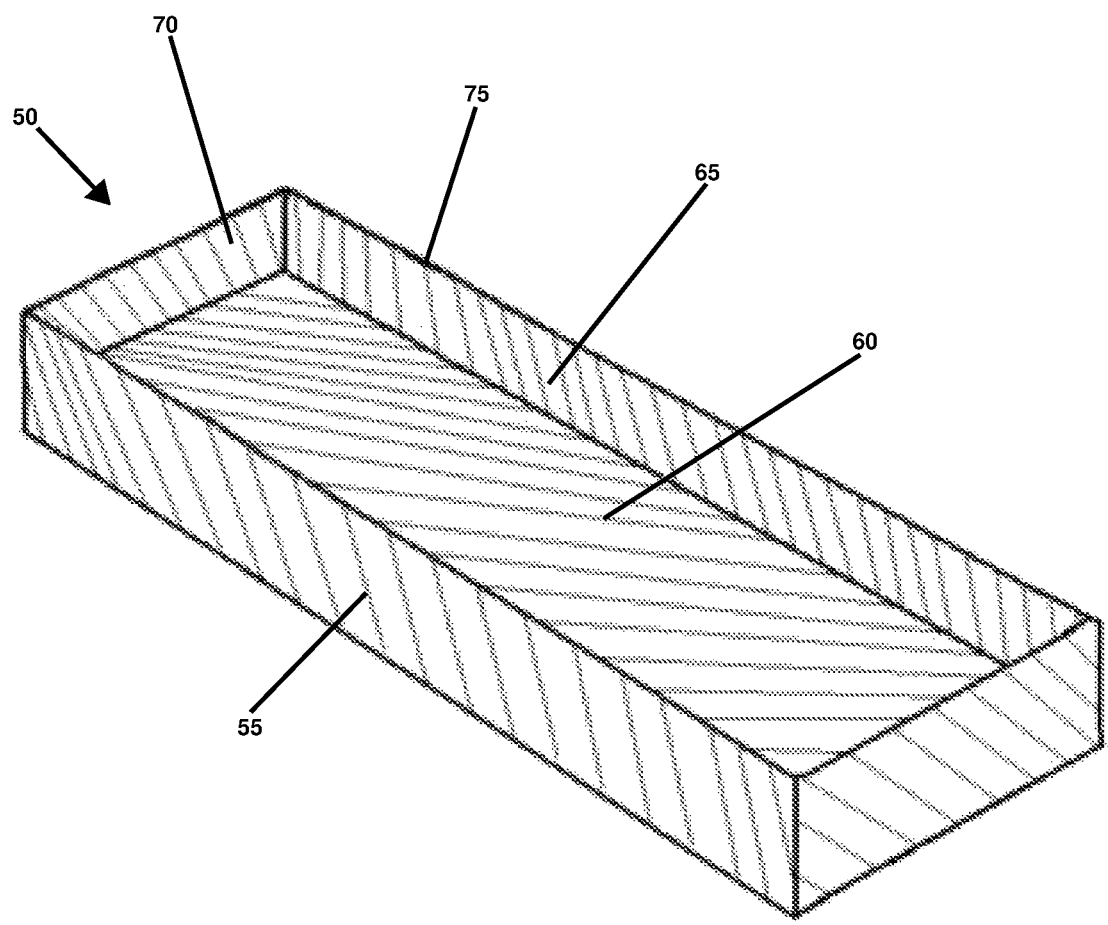
FIG. 3 shows a perspective view of the rubber coating according to another embodiment of the present disclosed technology.

FIG. 3 shows a perspective view of the rubber coating according to one embodiment of the present disclosed technology. In another embodiment, the rubber coating is formed in a casket tray 50 by chemically devulcanizing solid rubber, injecting the liquid devulcanized rubber into a casket tray mold, and letting the liquid rubber cool dry until it becomes solid. The casket tray 50 can then be used for mausoleums. The casket tray 50 is sized and shaped to be placed on the slab of a mausoleum. In one embodiment, the casket tray 50 is configured to removably receive a casket thereon. In another embodiment, the casket tray 50 is larger than the casket and includes a width and a length that is greater than the casket, such that when a casket is mounted thereon, the casket rests within a perimeter of the casket tray 50.

In one embodiment, the casket tray 50 includes a rectangular body 55 including a base and an upper surface 60. The upper surface 60 includes longitudinally extending sidewalls 65 and laterally extending sidewalls 70 that taper upwardly from the upper surface 60 to a perimeter edge 75 of the rectangular body 55. In this way, the sidewalls 65, 70 help receive and maintain a casket thereon. In one embodiment, the upper surface 60 is a flat surface.

Figure 4:
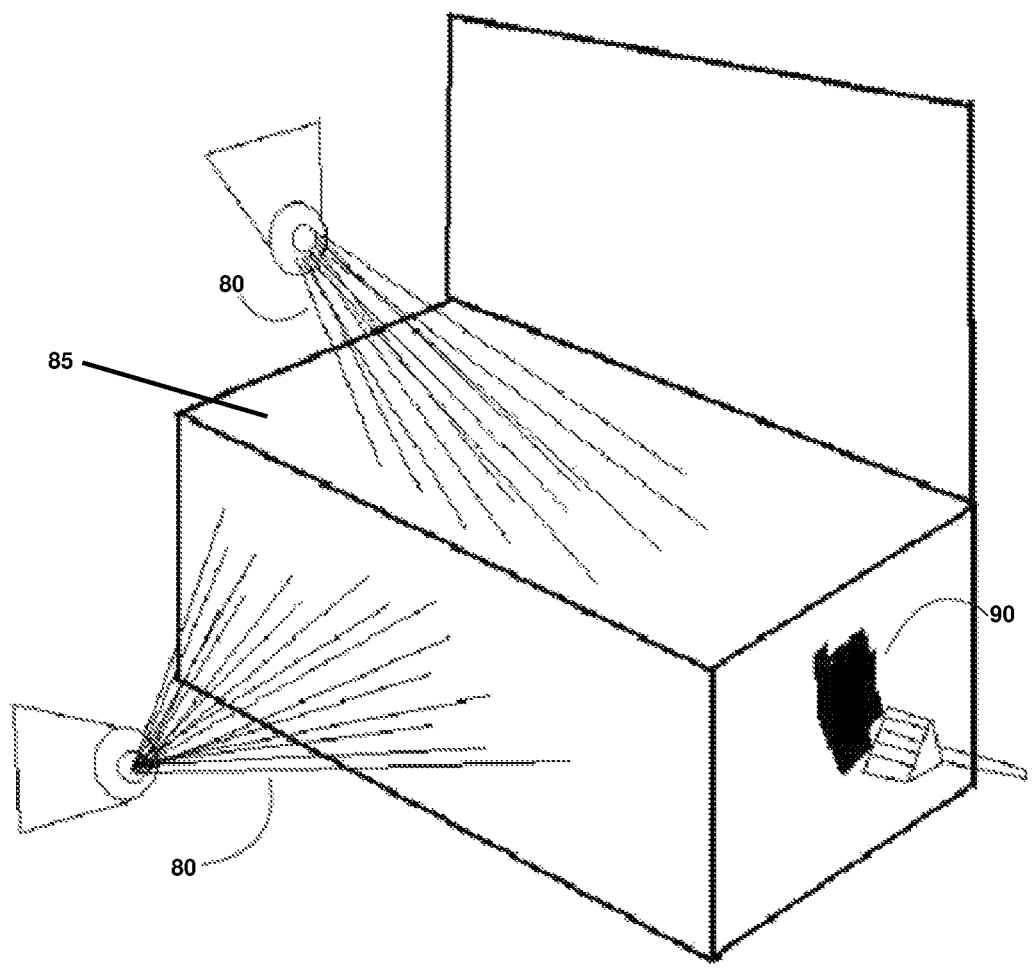
FIG. 4 shows a perspective view of the rubber coating in use according to alternative embodiment of the present disclosed technology.

FIG. 4 shows a perspective view of the rubber coating according to another embodiment of the present disclosed technology. In yet another embodiment, the rubber coating is formed into a rubber coating spray 80 by chemically devulcanizing solid rubber into liquid rubber, filling the liquid rubber into a pressurized spray container prior to the liquid rubber cooling or drying, and then preserving the liquid rubber within the spray container such that it does not solidify within the container prior to use. In this way, the rubber coating may be left in liquid rubber form until needed by a user to seal an item as desired. In one embodiment, the spray container is a pressurized can. In another embodiment, the spray container is a pressurized drum, such as a metal drum. In an alternative embodiment, the rubber coating spray is preserved in the spray container as an aerosol.

In one embodiment, the rubber coating spray 80 is sprayed on at least a portion of an exterior of a concrete burial vault 85, as shown in FIG. 3, in order to seal the exterior surface of the burial vault 85. In this way, the rubber coating spray 80 prevents water from entering the burial vault 85 from the exterior thereof and mixing with decomposed body fluids and prevents any decomposed body fluids from escaping the burial vault 85 and contaminating the grounds and water that are adjacent thereto. In another embodiment, the rubber coating spray 80 is sprayed on at least a portion of an interior of a concrete burial vault 85 in order to seal an interior of the burial vault 85. In yet another embodiment, the rubber coating spray 80 is sprayed on at least a portion of an interior of a casket and left to dry in order to form a solid liner cover at least a portion of the interior of the casket.

In some embodiments, the rubber coating may be formed into a rubber coating paint 90, as shown in FIG. 3, so that the rubber coating may be brushed on as desired by a user. In one embodiment, the rubber coating paint 90 is brushed on at least a portion of an exterior of the concrete burial vault 85, as shown in FIG. 3, in order to seal the exterior surface of the burial vault 85. In this way, the rubber coating paint 90 prevents water from entering the burial vault 85 from the exterior thereof and mixing with decomposed body fluids and prevents any decomposed body fluids from escaping the burial vault 85 and contaminating the grounds and water that are adjacent thereto.

Figure 5A:
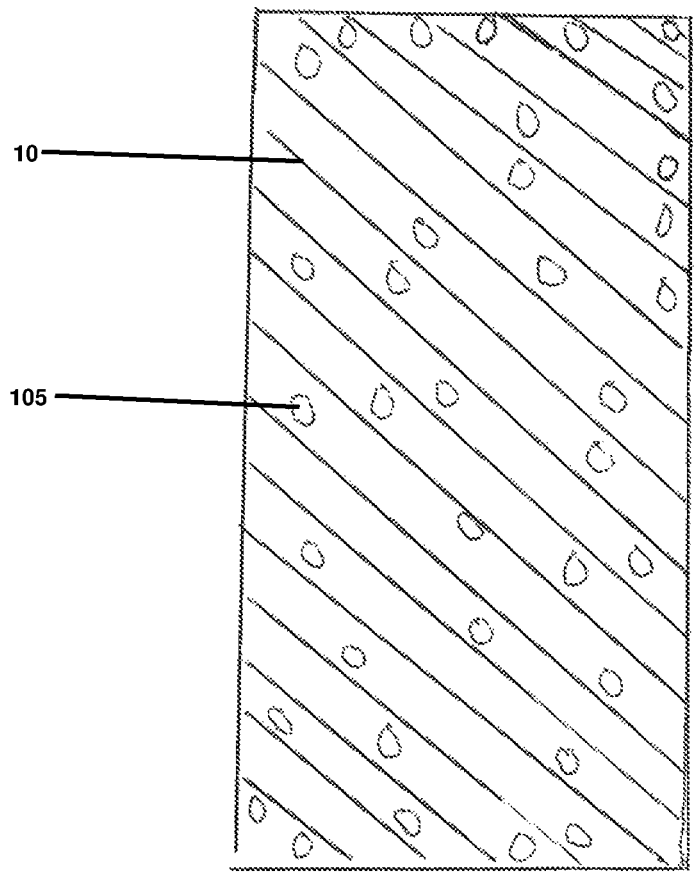
FIG. 5A shows a top plan view of the rubber coating in use according to another embodiment of the preset disclosed technology.
Figure 5B:
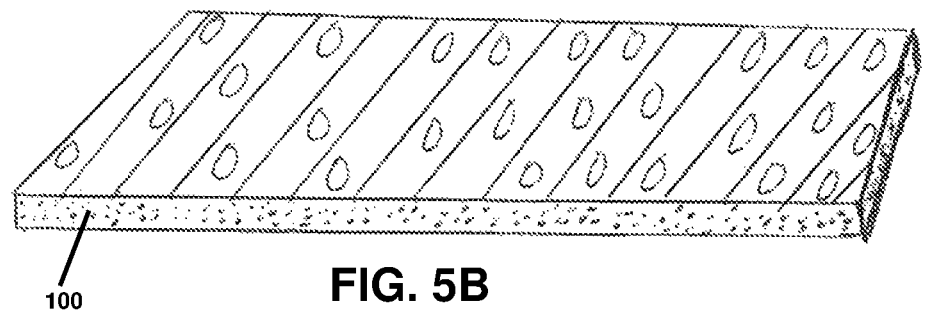
FIG. 5B shows a perspective view of the rubber coating in use according to another embodiment of the preset disclosed technology.

FIG. 5A shows a top plan view of the rubber coating in use according to another embodiment of the preset disclosed technology. FIG. 5B shows a perspective view of the rubber coating in use according to another embodiment of the preset disclosed technology. In another embodiment, the rubber coating 10 is used on a concrete walkway 100 in order to make the walkway 100 waterproof and slip proof to prevent slip and falls. In one embodiment, the rubber coating 10 is in rubber coating spray form and is sprayed on at least a portion of the concrete walkway 100 and left to dry in order to adhere to a surface thereof and seal the surface. In one embodiment, the rubber coating 10 includes a grainy texture 105 in order to make the rubber coating 10 and concrete walkway 100 slip proof.

Figure 6:
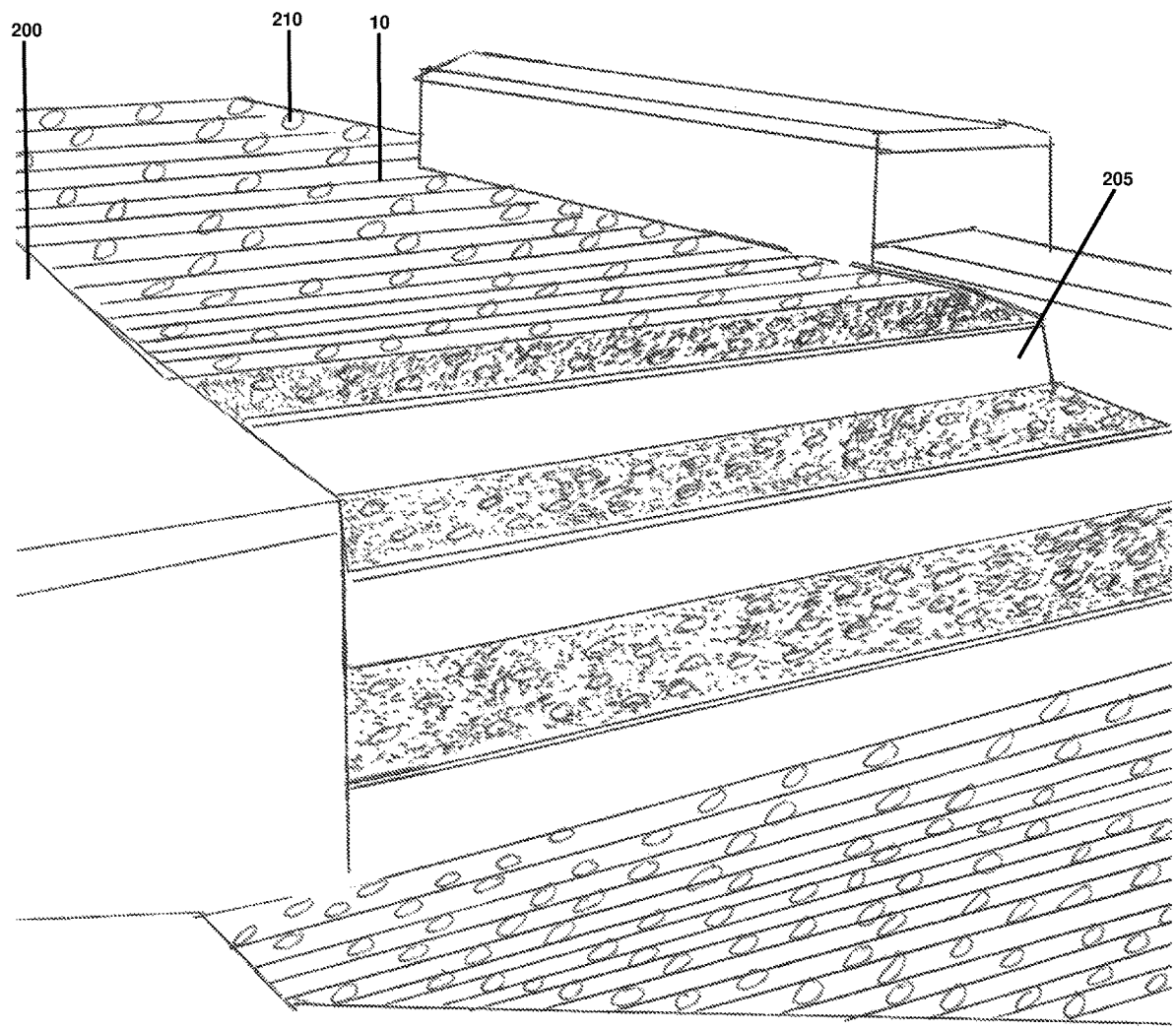
FIG. 6 shows a perspective view of the rubber coating in use according to yet another embodiment of the preset disclosed technology.

FIG. 6 shows a top plan view of the rubber coating in use according to yet another embodiment of the preset disclosed technology. In another embodiment, the rubber coating 10 is used on a wooden deck 200 with steps 205 in order to make the deck 200 and steps 205 waterproof and slip proof to prevent slip and falls. In one embodiment, the rubber coating 10 is in rubber coating spray form and is sprayed on at least a portion of the wooden deck 200 and steps 205 and left to dry in order to adhere to a surface thereof and seal the surface. In one embodiment, the rubber coating 10 includes a rough grainy texture 210 in order to make the rubber coating 10 and wooden deck 200 and steps 205 slip proof.

Figure 7:
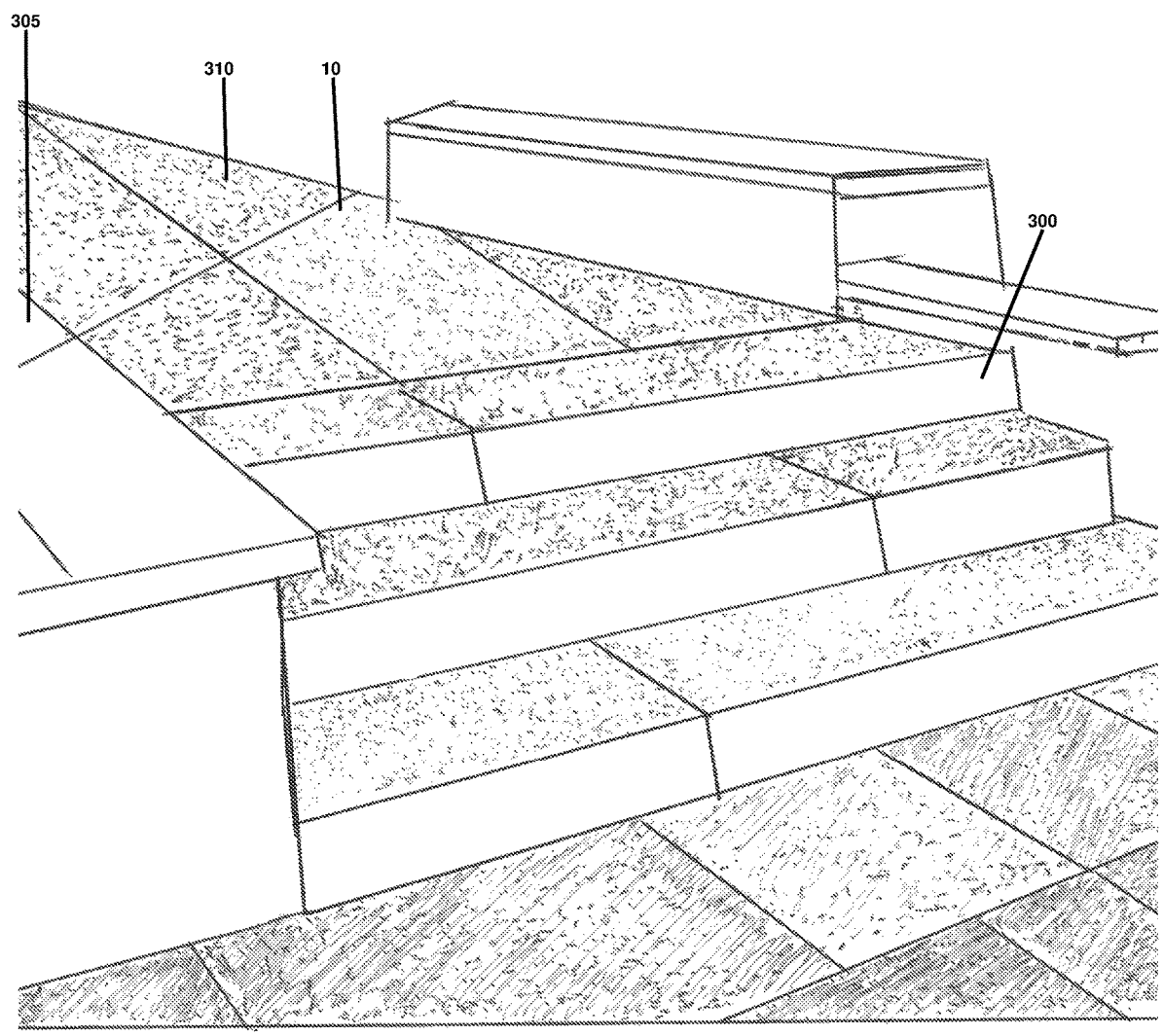
FIG. 7 shows a perspective view of the rubber coating in use according to yet another embodiment of the preset disclosed technology.

FIG. 7 shows a top plan view of the rubber coating in use according to yet another embodiment of the preset disclosed technology. In another embodiment, the rubber coating 10 is used on stone steps 300 and a stone tile walkway 305 in order to make the steps 300 and walkway 305 waterproof and slip proof to prevent slip and falls. In one embodiment, the rubber coating 10 is in rubber coating spray form and is sprayed on at least a portion of the steps 300 and stone tile walkway 305 and left to dry in order to adhere to a surface thereof and seal the surface. In one embodiment, the rubber coating 10 includes a smooth grainy texture 310 in order to make the rubber coating 10 and stone steps 300 and stone tile walkway 305 slip proof.

Figure 8:
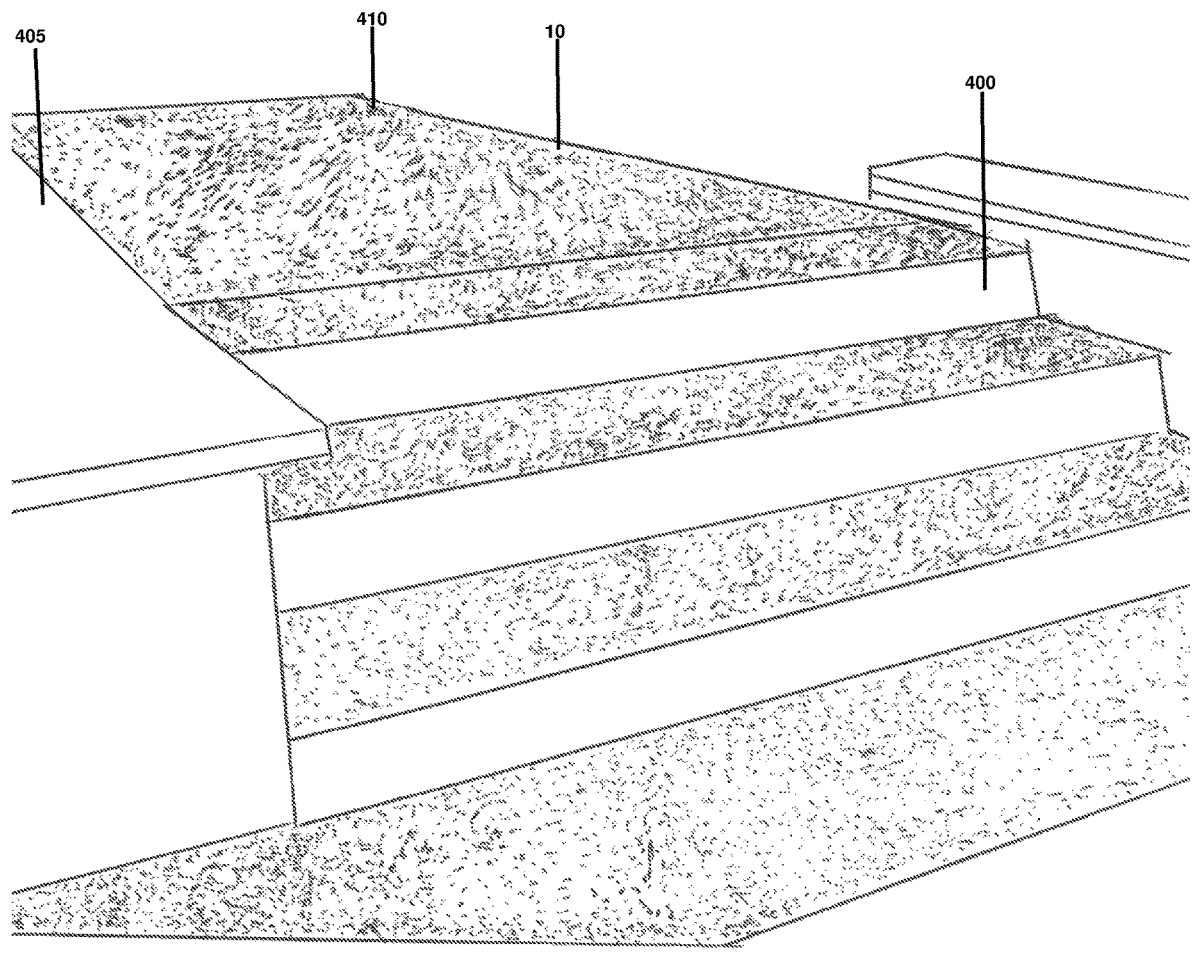
FIG. 8 shows a perspective view of the rubber coating in use according to yet another embodiment of the preset disclosed technology.

FIG. 8 shows a top plan view of the rubber coating in use according to yet another embodiment of the preset disclosed technology. In another embodiment, the rubber coating 10 is used on concrete steps 400 and a concrete walkway 405 in order to make the steps 400 and walkway 405 waterproof and slip proof to prevent slip and falls. In one embodiment, the rubber coating 10 is in rubber coating spray form and is sprayed on at least a portion of the steps 400 and walkway 405 and left to dry in order to adhere to a surface thereof and seal the surface. In one embodiment, the rubber coating 10 includes a medium grainy texture 410 in order to make the rubber coating 10 and concrete steps 400 and concrete walkway 405 slip proof.

Figure 9:
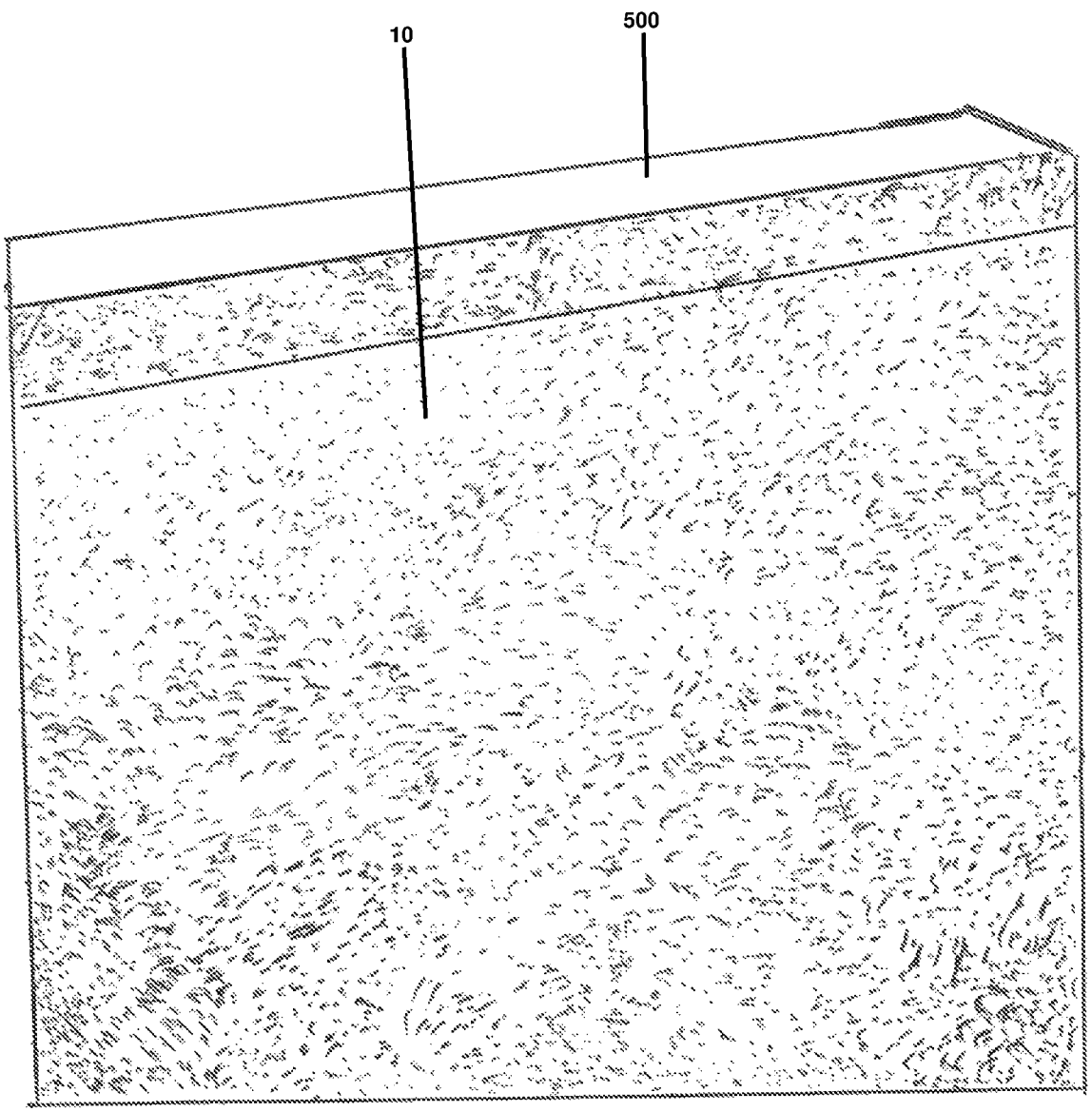
FIG. 9 shows a perspective view of the rubber coating in use according to yet another embodiment of the preset disclosed technology.

FIG. 9 shows a top plan view of the rubber coating in use according to yet another embodiment of the preset disclosed technology. In another embodiment, the rubber coating 10 is used on a foundation wall 500 in order to make the foundation wall 500 waterproof and prevent water from entering through a basement wall into the basement of a home. In one embodiment, the rubber coating 10 is in rubber coating spray form and is sprayed on at least a portion of the foundation wall 500 and left to dry in order to adhere to a surface thereof and seal the surface.

Figure 10:
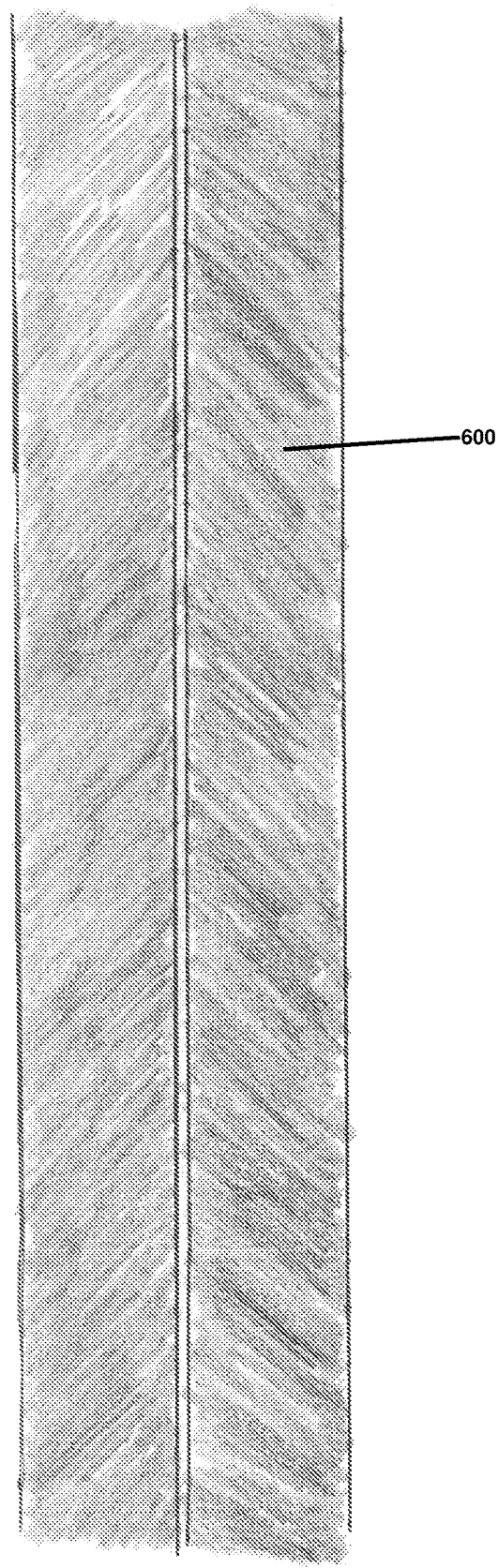
FIG. 10 shows a side view of the rubber coating in use according to yet another embodiment of the preset disclosed technology.
Figure 11:
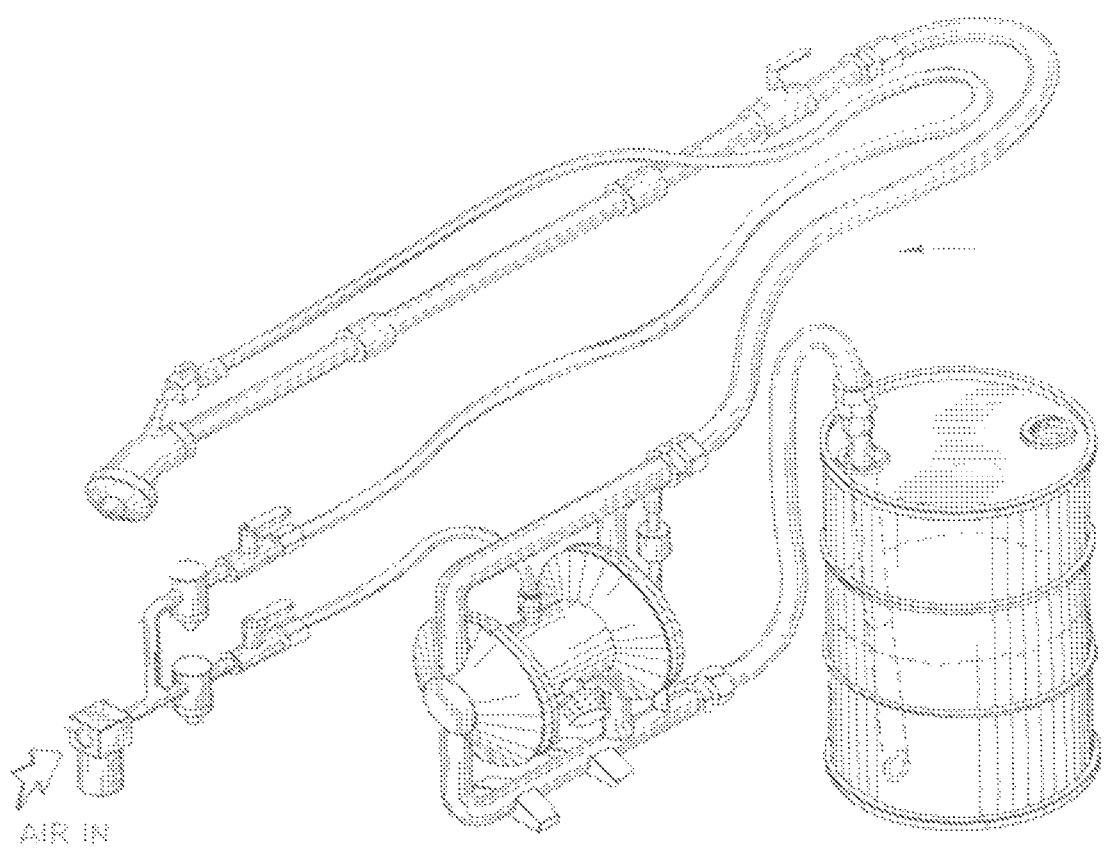
FIG. 11 shows a commercial spraying apparatus used in embodiments of the disclosed technology.
Figure 12:
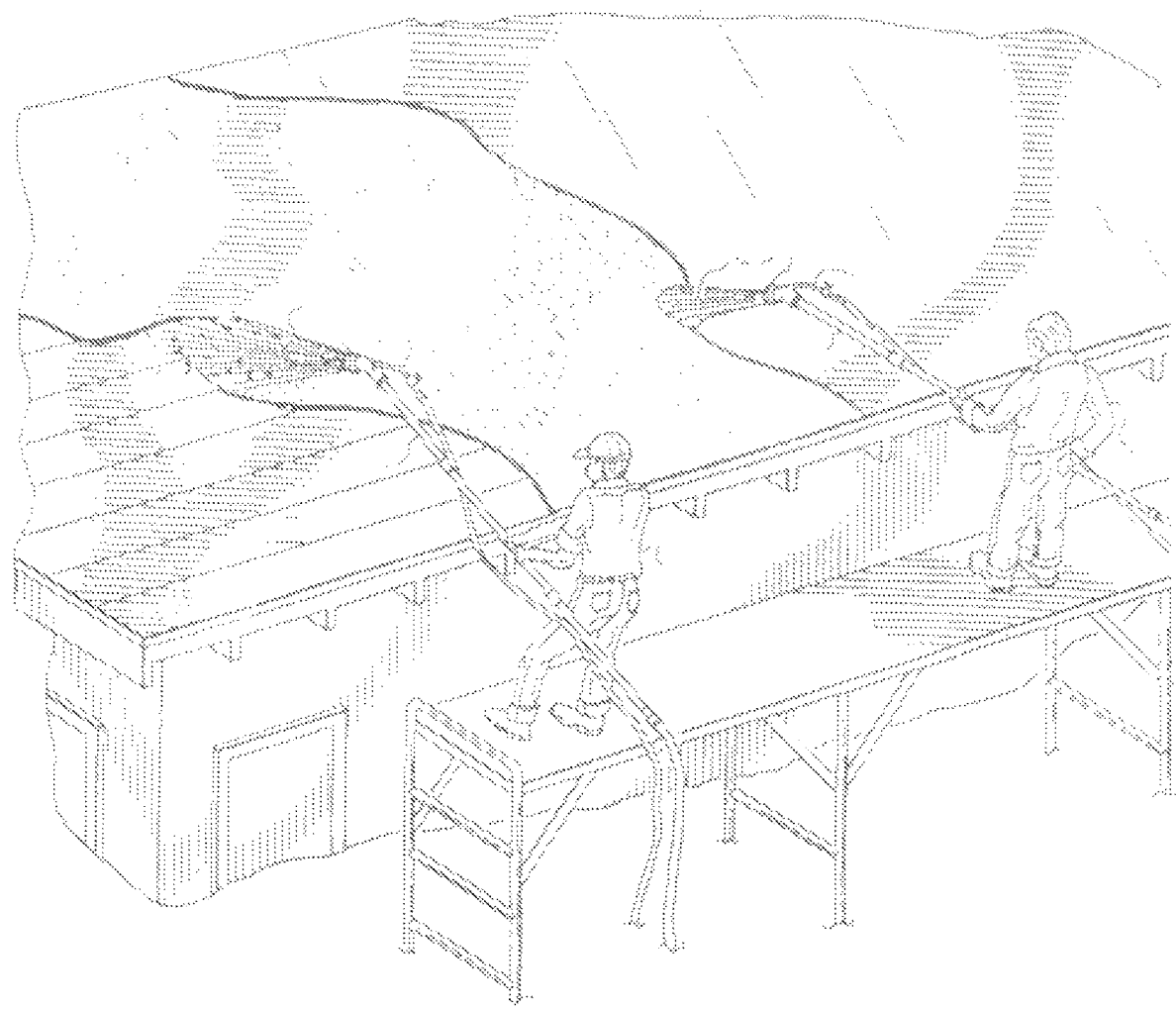
FIG. 12 shows a commercial spraying apparatus used to spray a roof in embodiments of the disclosed technology.

FIG. 10 shows a top plan view of the rubber coating in use according to yet another embodiment of the preset disclosed technology. In another embodiment, rubber tires sourced from vehicle tires are chemically devulcanized into liquid rubber. Then the liquid rubber is mixed with asphalt prior to the liquid rubber cooling in order to form a liquid rubber-asphalt mixture 600. Then the liquid rubber-asphalt mixture is used to pave a surface. The surface is then dried in order to allow the liquid rubber-asphalt mixture 600 to solidify over the surface. The rubber coating strengthens the structural integrity of the road and prevents the paved asphalt from cracking, breaking and separating over time.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A method of lining a casket, comprising the steps of:
carrying out chemical devulcanization of rubber sourced from vehicle tires to create liquid rubber;
injecting said liquid rubber into a mold for use in said casket and leaving said liquid rubber to dry into a liner, wherein said liner coats at least a part of an interior of said casket.

2. The method of claim 1, further comprising a step of placing at least some of said liquid rubber in a spray can.

3. The method of claim 2, further comprising a step of spraying at least a portion of a burial vault.

4. The method of claim 3, wherein said portion of said burial vault is an outside of said burial vault.

5. The method of claim 3, wherein said portion of said burial vault is an interior of said burial vault.

6. The method of claim 2, wherein said liner is additionally formed from spraying said at least a part of an interior of said casket with said liquid rubber from said spray can, wherein said spray can is a pressurized container.

7. The method of claim 1, wherein said method prevents fluids from leaking out of said casket and water from entering and mixing with decomposed body fluids within said casket.

8. The method of claim 1, wherein said casket is placed in a mausoleum within a casket tray formed from said liquid rubber.

9. The method of claim 1, wherein the liner includes a rectangular body including a base and a planar upper surface, the planar upper surface including longitudinally extending sidewalls and laterally extending sidewalls that taper upwardly from the planar upper surface to a perimeter edge of the rectangular body.

10. The method of claim 1, wherein additional chemically devulcanized rubber formed from said chemical devulcanization of rubber is placed on an outside of said casket.

* * * * *